T. V. BUCKWALTER.
TIRE.
APPLICATION FILED APR. 29, 1910.
1,016,472.
Patented Feb. 6, 1912.
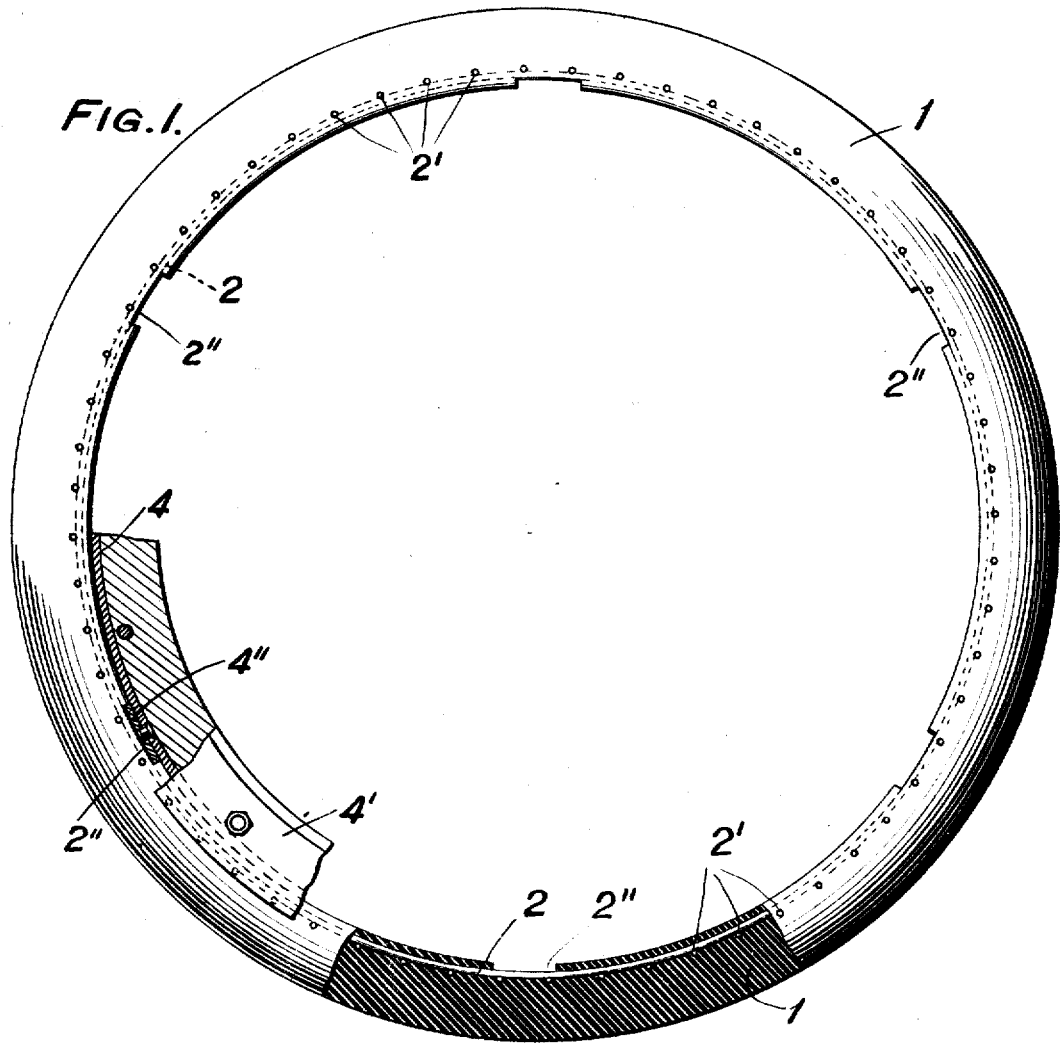
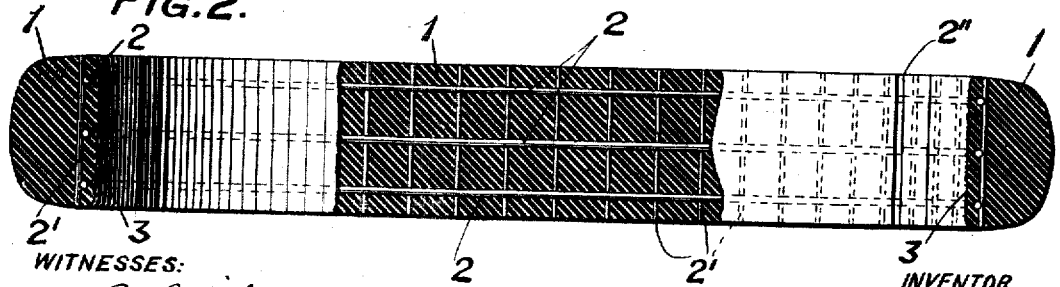
WITNESSES:
INVENTOR
Tracy V. Buckwalter
BY
Charles N. Butler
ATTORNEY.

UNITED STATES PATENT OFFICE.

TRACY V. BUCKWALTER, OF ALTOONA, PENNSYLVANIA.

TIRE.

1,016,472. Specification of Letters Patent. Patented Feb. 6, 1912.

Application filed April 29, 1910. Serial No. 558,436.

*To all whom it may concern:*

Be it known that I, TRACY V. BUCKWALTER, a citizen of the United States, residing at Altoona, in the county of Blair and State of Pennsylvania, have invented certain Improvements in Tires, of which the following is a specification.

My invention relates to tires composed of resilient material such as rubber.

It comprises, in its preferred form, a rubber ring having embedded in the inner part thereof, adjacent to the surface which bears upon the rim of the wheel, an open work metal band, consisting preferably of wire hoops connected by wires welded thereto.

The leading object of my invention is to provide improved means for holding the body of a resilient tire firmly on the rim of the wheel.

A further object is to provide a simple and comparatively inexpensive construction which can be produced by molding a body composed wholly of resilient material directly upon a reinforcing band which is adapted for supporting and holding it in position on the wheel rim.

The characteristic features and advantages of my improvements will more fully appear by reference to the following description and the accompanying drawings in illustration thereof.

In the drawings, Figure 1 is a sectional side elevation of a section of a rim in combination with a tire embodying my improvements, and Fig. 2 is a broken transverse sectional view of the tire.

The tire, as illustrated, is composed of a rubber body 1 having embedded or interlocked therein an open work or open mesh reinforcing band comprising wire rings or hoops 2 connected together by cross wires 2' welded thereto, the band being disposed adjacent to and concentric with the tire's inner covering of woven fabric 3, which bears upon the rim 4 of the wheel. It is generally preferable to have the cross wires 2' of smaller gage than that of the wires forming the hoops 2 and such cross wires are placed exteriorly to the hoops to effect the desired engagement without extension into the body of and waste of rubber.

The rim 4 has one of its flanges 4', for holding the tire on the wheel, removable, to permit the tire to be drawn on or off. The periphery of the rim has fixed thereon projecting anchor blocks 4'' which are adapted for engaging the transverse channels 2'' formed within the tire, the engagement preventing the tire from creeping.

The rubber body 1, by the use of a band of this character, can be made of soft rubber throughout, with the production of a tire that has the desired resiliency in its tread and firmness in its inner portion adjacent to its bearing upon the rim of the wheel.

Having described my invention, I claim:

A tire comprising a resilient body and an open-work reinforcing metal band embedded therein, said band comprising a wire hoop and a plurality of cross wires of smaller gage welded exteriorly to the hoop, substantially as described for the purpose set forth.

In witness whereof I have hereunto set my name this 27th day of April, 1910, in the presence of the subscribing witnesses.

TRACY V. BUCKWALTER.

Witnesses:
 H. WOOD,
 P. H. MARKLEY.